United States Patent
Cook, Jr. et al.

[11] Patent Number: 5,722,687
[45] Date of Patent: Mar. 3, 1998

[54] AIRBAGS SQUIB WITH TEMPERATURE BIAS

[75] Inventors: Charles R. Cook, Jr., Rochester Hills; Horst Belau, Clarkston; Mark A. Parsons, Rochester, all of Mich.

[73] Assignees: Siemens Automotive Corporation, Auburn Hills; Ford Motor Company, Dearborn, both of Mich.

[21] Appl. No.: 599,611

[22] Filed: Feb. 9, 1996

[51] Int. Cl.$^6$ .................. B60R 21/26; B60R 21/32
[52] U.S. Cl. ............. 280/735; 280/741; 102/202.5; 307/10.1
[58] Field of Search ................ 280/735, 734, 280/736, 741, 728.1; 102/202.5; 340/436, 438; 307/10.1

[56] References Cited

U.S. PATENT DOCUMENTS

| | | | |
|---|---|---|---|
| 4,819,560 | 4/1989 | Patz et al. | 102/202.5 |
| 4,843,964 | 7/1989 | Bickes, Jr. et al. | 102/202.5 |
| 5,122,954 | 6/1992 | Okano | 280/735 |
| 5,400,867 | 3/1995 | Muller et al. | 280/735 |
| 5,577,768 | 11/1996 | Taguchi et al. | 280/735 |

FOREIGN PATENT DOCUMENTS

| | | | |
|---|---|---|---|
| 4-201762 | 7/1992 | Japan | 280/735 |
| 4-342638 | 11/1992 | Japan | 280/735 |

OTHER PUBLICATIONS

Research Disclosure No. 37040, "Heated and/or Cooled Liquid Inflator System", disclosed anonymously, Feb. 1995.

Primary Examiner—Peter C. English
Attorney, Agent, or Firm—Russel C. Wells

[57] ABSTRACT

A control arrangement for a deployable airbag of a vehicle is provided with a squib for firing in response to a deployment command signal whereby the deployable airbag is deployed. Bilateral communication is effected between the control arrangement and an airbag electronic controller. Electrical energy and data, including the deployment command signal are conveyed to the control arrangement, and at least self-diagnosis information is conveyed to the airbag electronic controller. The squib is configured to require a predeterminable minimum quantum of energy to effect the firing thereof in response to the deployment command signal. A heater provides a radiated preheat to the squib, whereby the predeterminable minimum quantum of energy applied to effect firing of the squib is exceeded by a combination of the first electrical energy and the radiated preheat energy. The squib and the preheater preferably are both formed on a silicon substrate using a conventional integration process. The radiated preheat energy is monitored and controlled, and the energy required to effect firing of the squib is proportional to the difference between temperature of the squib, in response to the radiated preheat energy, and the predeterminable firing threshold temperature of the squib.

20 Claims, 2 Drawing Sheets

AIRBAGS SQUIB WITH TEMPERATURE BIAS

RELATIONSHIP TO OTHER APPLICATION

This application is related to a copending application entitled Airbag Squib With Silicon Circuit and Energy Storage, which was filed on the same date as the present application, Feb. 9, 1996 and having U.S. Ser. No. 08/599,613, and assigned to the same assignee as herein. The disclosure of the copending application is incorporated herein by reference.

BACKGROUND OF THE INVENTION

1. Field of the Invention

This invention relates generally to supplemental restraint systems for vehicles, and more particularly, to an arrangement for controlling the operation of a deployable supplemental restraint airbag system.

2. Description of the Related Art

Supplemental restraint systems which typically are used in vehicles deploy an inflatable airbag that is coupled to a gas generating device. When a fault condition of the type requiring deployment of an inflatable airbag is present, an electronic control unit, in response to a fault condition signal, causes a predeterminable quantum of electrical energy to be delivered to an airbag squib. The squib, which is in communication with the gas generator, causes the generator to inflate the airbag by releasing rapidly an inert, non-toxic gas, such as nitrogen. The rate of release of the gas is sufficient to inflate the airbag generally within milliseconds of the onset of the fault condition.

Typically, a fault condition will result from a collision by the vehicle. A sensor, that may take the form of a normally-open switch, operates in response to an inertial mass to complete an electrical circuit that causes the electronic control unit to issue a relatively large current to the squib. Ultimately, this causes the gas generator to be activated, or ignited, resulting in the rapid release of the inert gas.

In conventional airbag systems, the electronic control unit contains almost all of the circuitry, including an energy storage device that stores the energy that ultimately is released to the squib for firing same. The stored energy, therefore, is transferred from the electronic control unit over cables to the squib, which generally is at a location remote from the electronic control unit. The electronic control unit monitors the connection between it and the squib, generally each time the vehicle is started, to ensure the integrity of the system. Thus, the electronic control unit measures accurately all of the parameters that ensure that the system will be operable, when required. Among such items to be checked is the integrity and resistivity of the cables that interconnect the squib to the electronic control unit, and over which the squib ignition energy is delivered.

One disadvantage of the known inflatable airbag control arrangements is that a highly reliable, low resistivity, interconnection must be maintained between the electronic control unit and the squib. Such an interconnection cannot tolerate short-circuiting to ground or the application of battery potential on either cable. In addition, the cost and complexity of the electronic control unit in the known arrangements is high, since high voltage circuitry for generating the ignition energy for the squib is packaged with the control circuitry.

It is, therefore, an object of this invention to provide an airbag control system for a vehicle wherein long, high integrity, low resistivity cables for conducting squib firing energy between an airbag control unit and a remotely located airbag firing squib are obviated.

It is another object of this invention to provide an airbag firing squib that requires a reduced amount of electrical current to achieve reliable firing.

It is also an object of this invention to provide an airbag squib arrangement wherein a firing current is delivered with greater efficiency over known arrangements.

It is a further object of this invention to provide an airbag control system for a vehicle wherein the economies of component integration are achieved.

It is additionally an object of this invention to provide an airbag control system for a vehicle wherein the capacity of a firing energy storage element, such as a capacitor, is reduced.

It is yet a further object of this invention to provide an airbag control system for a vehicle wherein a high level of noise immunity is achieved to prevent inadvertent firing of the squib in response to electrical noise.

It is also another object of this invention to provide an airbag control system for a vehicle wherein problems associated with heat dissipation are reduced.

It is yet an additional object of this invention to provide an airbag control system for a vehicle wherein the size of the airbag electronic control unit can be reduced.

It is still another object of this invention to provide an airbag control system for a vehicle wherein a greater magnitude of electrical resistance can be tolerated in the communication between the airbag electronic control unit and the squib.

It is a yet further object of this invention to provide an airbag control system for a vehicle wherein the need on the part of the airbag electronic control unit to monitor cable resistance between itself and the squib is reduced.

It is also a further object of this invention to provide an airbag control system for a vehicle wherein inadvertent firing of the squib in response to the application of a DC potential is prevented.

It is additionally another object of this invention to provide an airbag control system for a vehicle wherein significant electrical faults are tolerated, particularly a short-circuit to ground potential, in the cable wiring between the airbag electronic control unit and the squib.

It is also an additional object of this invention to provide an airbag control system for a vehicle wherein significant electrical faults are tolerated, particularly the application of a battery potential to the cable wiring between the airbag electronic control unit and the squib.

An additional object of this invention is to provide an airbag control system for a vehicle wherein the need for a high voltage power source at the airbag electronic control unit is obviated.

SUMMARY OF THE INVENTION

The foregoing and other objects are achieved by this invention which provides, in a first apparatus aspect thereof, a squib control arrangement for an airbag restraint system for a vehicle, the squib control arrangement being provided with a communication arrangement for receiving an electrical input signal containing a data component and an energy component. A squib has a firing portion and a preheating portion, whereby heat produced in the preheating portion is conducted to the firing portion. A first coupling arrangement is provided for coupling the communication arrangement to the preheating portion of the squib, and for supplying electrical energy thereto in response to the energy component of the electrical input signal. Additionally, a second electrical coupling arrangement couples the communication arrangement to the firing portion of the squib, for causing the squib to fire in response to the data component of the electrical input signal.

In one embodiment of the invention, the firing portion of the squib is formed of a silicon material. Preferably, the firing and preheating portions of the squib are integrally formed on a silicon material or substrate. There is additionally provided a heat sink for drawing heat away from the firing portion of the squib.

In a further embodiment of the invention, there is further provided a temperature controller for monitoring the temperature of the squib. Preferably, the temperature controller and the firing and preheating portions of the squib are integrally formed on a silicon substrate.

An energy storage element is coupled to the communication arrangement for storing electrical energy in response to an energy supply component of the electrical signal that is delivered to the control arrangement from an airbag electronic control unit that is located in a remote location. The energy is provided via an electrical coupling arrangement that connects the airbag control unit output to the communication arrangement, the quantum of energy stored in the energy storage element being controlled by an energy controller.

In accordance with a further apparatus aspect of the invention, a control arrangement is provided for controlling deployment of a deployable airbag of a vehicle, the vehicle being of the type having at least one fault sensor for providing a fault signal in response to the occurrence of a fault condition that would require the deployment of the deployable airbag. In accordance with the invention, the control arrangement is provided with an airbag controller formed on a silicon substrate. The airbag controller is further provided, also formed on the silicon substrate, a squib that is coupled to the communication controller for firing in response to the fault signal and a preheat energy, whereby the deployable airbag is deployed. A self-diagnosis system performs a diagnostic process on the airbag controller. Also, a communications port receives a data signal that includes information responsive to the fault sensor, and transmits the self-diagnosis data from the self-diagnostic system.

In one embodiment of this further apparatus aspect of the invention, there is further provided an energy storage element for storing electrical energy, and a preheater for providing the preheat energy to the squib. Preferably, the squib and the preheater are integrally formed on the silicon substrate.

There is additionally provided an energy transformer for converting an electrical energy to a higher potential, whereby a greater quantum of energy is stored in the energy storage element. A preheat monitor provides an electrical characteristic responsive to the magnitude of the preheat energy. In a preferred embodiment, the preheat monitor is formed on the silicon substrate.

In accordance with a method aspect of the invention, a method is provided for controlling an inflatable airbag of a vehicular supplemental restraint system. In accordance with the invention, the method includes the steps of:

forming the ignitable squib on a semiconductor substrate;

first supplying an electrical energy to a heater element formed on the semiconductor substrate whereby the heater element generates a preheat energy;

applying the preheat energy from the heater element to the ignitable squib whereby the squib is heated to a preheat temperature that is below its ignition threshold temperature; and second supplying a further electrical energy to the squib, whereby the combination of the heat energy supplied to the squib and the further electrical energy exceed the ignition threshold temperature of the squib.

In one embodiment of this method aspect of the invention, there is further provided the step of further forming the heater element on the semiconductor substrate. In a further embodiment, prior to performing the step of second supplying, there is provided the further step of storing the further electrical energy in a storage element and in an amount that corresponds to the difference between the predeterminable ignition threshold temperature and the preheat temperature.

In a still further embodiment of the method aspect of the invention, there are provided the further steps of:

forming a heat monitor on the semiconductor substrate;

monitoring with the heat monitor the preheat energy applied from the heater element to the squib; and controlling the rate of generation of the preheat energy in response to the step of monitoring.

BRIEF DESCRIPTION OF THE DRAWING

Comprehension of the invention is facilitated by reading the following detailed description, in conjunction with the annexed drawing, in which.

DETAILED DESCRIPTION

Figure 1:
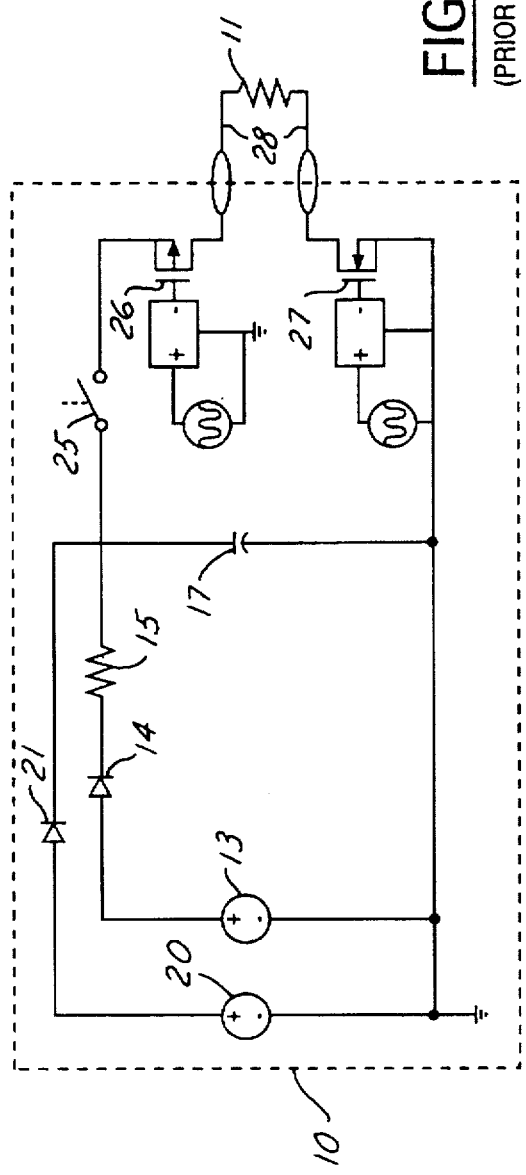
FIG. 1 is a partially schematic and partially function block representation of a prior art electronic airbag controller.

FIG. 1 is a partially schematic and partially function block representation of a prior art arrangement used for controlling the operation of a supplemental restraint inflatable airbag (not shown) for a vehicle (not shown). As shown in the figure, airbag controller 10 contains essentially all of the circuitry for firing a squib 11. In operation, a high voltage power supply 13 supplies energy having a high voltage characteristic via a diode 14 and a resistor 15 to a capacitor 17 that functions as an energy storage element. The high voltage energy is prevented from supplying the vehicle's battery 20 by operation of a blocking diode 21.

When a fault condition is detected, as would be the case in the event of a collision of the vehicle (not shown), a safing sensor 25 is closed and electronic switches 26 and 27 close immediately thereafter. The closure of electronic switches 26 and 27 permits capacitor 17, that has been charged to a relatively high potential by operation of high voltage power supply 13, to discharge through squib 11 via coupling cables 28.

As previously mentioned, it is critical that coupling cables 28 be checked often for conductive integrity and that they maintain low resistivity in order that the current pulse delivered from capacitor 17 not be impeded, thereby ensuring reliable firing of squib 11.

In the centralized airbag control system of FIG. 1, energy has to be transferred from the airbag controller over cables 28 to squib 11. The connection between the squib and the airbag controller must have a low impedance, and the airbag controller must monitor this connection each time the system is operated, such as during the start-up of the vehicle, to guarantee the system integrity.

Figure 2:
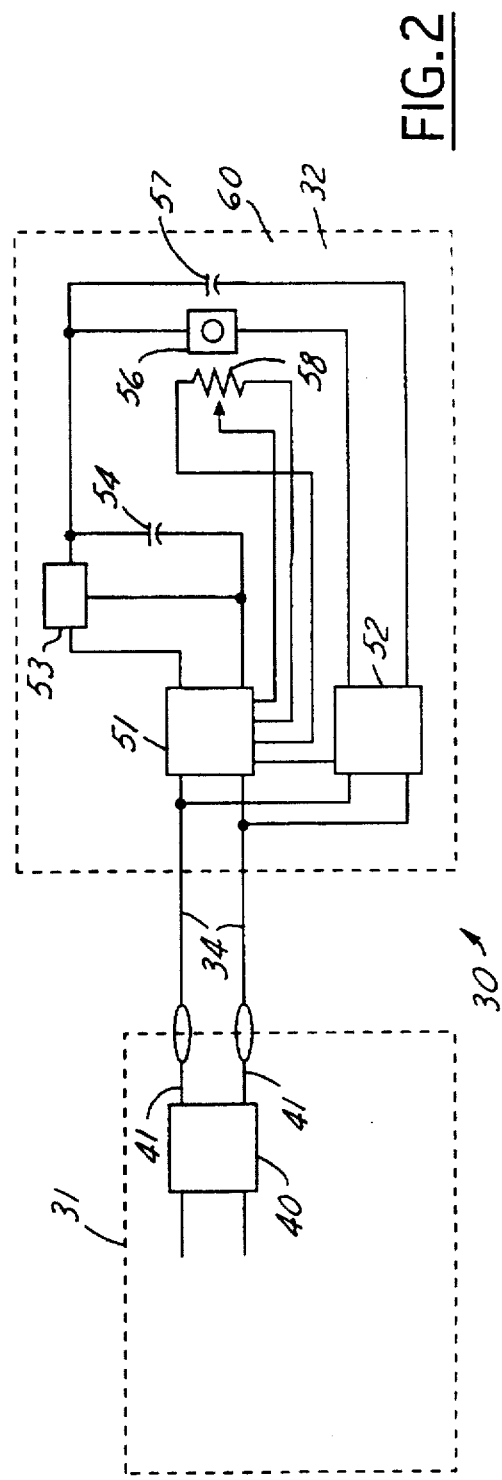
FIG. 2 is a partially schematic and partially function block representation of an airbag control system constructed in accordance with the principles of the invention.

FIG. 2 is a schematic and function block representation of an airbag control arrangement 30 constructed in accordance with the principles of the invention. As shown, the airbag control arrangement 30 is formed generally of an airbag electronic control unit 31 and a second airbag controller 32. Airbag electronic control unit 31 and second airbag controller 32 are coupled to one another via a communication coupling arrangement that, in this specific illustrated embodiment of the invention, is in the form of cables 34. Cables 34 form a propagation path for transmission of a deployment command signal, which will be described hereinbelow.

Airbag electronic control unit 31 contains within it a communication module 40 that issues at its outputs 41 signals that include indications of fault conditions that would require deployment of the airbag (not shown) as will be described herein. Persons of skill in the art can readily determine the conditions of the vehicle that would cause the need for deployment of a supplemental restraint airbag, and the particular modality of the electrical signal that would indicate such a condition. In addition, in this specific illustrative embodiment of the invention, cables 34 are electrically conductive and, in addition to the deployment command signal, also transfer electrical energy to second airbag controller 32. This electrical energy is used, as described below, to enable deployment of the airbag. It is to be understood that, in other embodiments of the invention, the propagation of signals between airbag electronic control unit 31 and second airbag controller 32 need not be via electrically conductive cables, such as cables 34, but may be achieved via other modes of communication that might not require the use of electrically conductive media. In such further embodiments, the electrical energy would be conveyed via separate communications path (not shown). The delivery of such electrical energy to second airbag controller 32 is within the scope of the abilities of a person of ordinary skill in the art.

Second airbag controller 32 receives the communication signals and the electrical energy transferred via cables 34 at a second communication module 51 and an energy control module 52. In this specific illustrative embodiment of the invention, electrical energy is conducted from second communication module 51 to a transformer element 53 that raises the voltage of the electrical energy and thereby increases the quantum of charge that can be stored in capacitor 54, that functions as the energy storage device.

Also in this embodiment, the electrical energy that is issued from transformer element 53 is conducted through heat device 56 which is shown to be proximal to an ignitable squib 57. In this manner, the heat that is radiated or conducted by heat radiating device 56 is applied to squib 57 so as to preheat same. The heat is monitored by a heat monitor device 58 that has an electrical characteristic that varies with the heat. Thus, for example, heat monitoring device 58 may be a thermistor having a resistance that varies with temperature, specifically the heat applied thereto. The heat monitoring device is connected to second communication module 51 that issues a corresponding control signal to energy control module 52. The energy control module controls the current through the heat radiating device 56 in response to the variation of the electrical characteristic of heat monitoring device 58. In this manner, the heat that is applied to preheat squib 57 is controlled, and it is therefore ensured that squib 57 is not heated beyond its inherent ignition threshold.

At such time as it is determined that a fault condition exists in the vehicle (not shown) that should result in the deployment of the supplement restraint airbag (not shown), the airbag electronic control unit 31 issues an airbag deployment signal via cables 34 to second communication module 51 and energy control module 52. Energy control module 52 closes a circuit that permits the energy stored in capacitor 54 to be conductive through the squib. The magnitude of the current that flows through squib 57 and that would be required to ignite same is reduced by operation of the preheat applied by heat radiating device 56.

In the practice of the invention, electrical energy is supplied to second communication module 51, the electrical energy having a first voltage characteristic. The second communication module delivers electrical energy to transformer element 53 that converts the electrical energy to have a second voltage characteristic that, in this embodiment, corresponds to a greater potential than the first voltage characteristic. This electrical energy having the elevated voltage characteristic is supplied to energy storage element 54 and to heat radiating device 56, as previously described. The heat issued by the heat radiating device 56 is monitored by heat monitor element 58, and the resulting change in its electrical characteristic is employed to control the magnitude of the current flowing through heat radiating device 56. In a preferred embodiment of the invention, heat radiating device 56, squib 57, and heat monitoring device 58 are formed on a silicon material or substrate 60. In other embodiments, second communication module 51 and energy control module 52 are also formed on the silicon substrate. In some embodiments of the invention, capacitor 54 can be mounted within the housing (not shown) of the second airbag controller, or it can be placed externally, near a connector (not shown).

Figure 3:
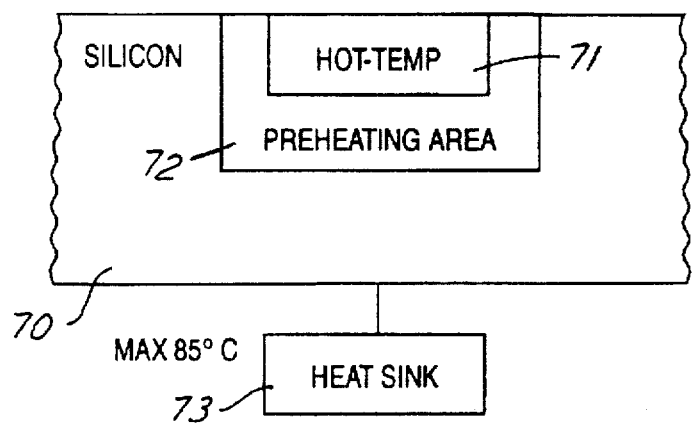
FIG. 3 is a schematic representation of a squib arrangement formed on a silicon substrate, in accordance with the principles of the invention.

FIG. 3 is a schematic representation of a squib arrangement formed on a silicon substrate, in accordance with the principles of the invention. As shown, a silicon substrate 70 has formed therein a hot temp or squib firing region 71 that, as described herein, will ignite upon application of sufficient energy. In this specific illustrative embodiment of the invention, the squib firing region is disposed in proximity to a preheating region 72, that also is integrally formed on the silicon substrate. In addition, the silicon substrate is associated with a heat sink 73, that is useful to maintain the substrate temperature below a predetermined threshold. In a practicable embodiment of the invention, the substrate temperature is maintained below 85° C.

Figure 4:
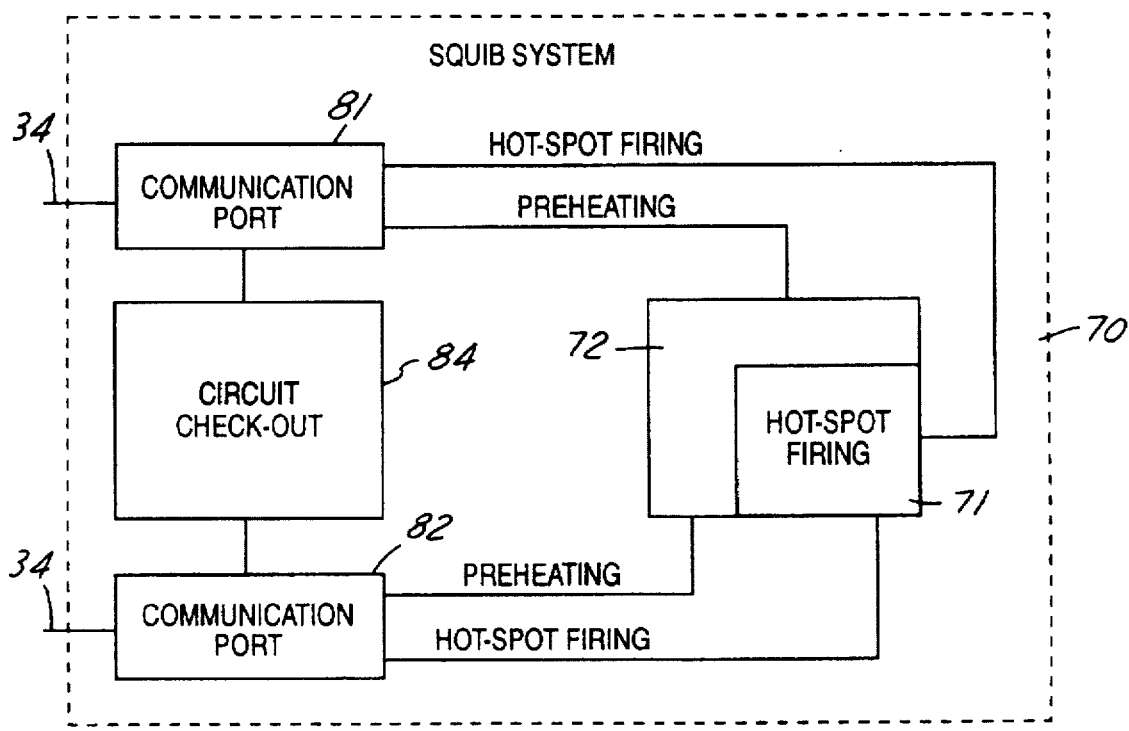
FIG. 4 is a partially schematic and partially function block representation of an airbag control system used in conjunction with the integrated squib arrangement of FIG. 3.

FIG. 4 is a partially schematic and partially function block representation of an airbag control system 80 used in conjunction with the integrated squib arrangement of FIG. 3. Airbag control system 80 performs a function similar to that described hereinabove with respect to second airbag controller 32, shown in FIG. 2. Elements of structure that bear correspondence to those previously described are similarly designated. As shown in FIG. 4, airbag control system 80 is coupled to an airbag electronic control unit (not shown), such as airbag electronic control unit 31 (FIG. 2) via cables 34. In this specific illustrative embodiment of the invention, cables 34 couple to respectively associated ones of communications ports 81 and 82. The communications ports are, in this specific illustrative embodiment of the invention, capable of bidirectional communication. Thus, not only do the communications ports receive data signals (not shown) from the airbag electronic control unit, they also transmit data, such as data derived from self-diagnosis by operation of a circuit check-out or self-diagnosis module 84, which is shown to be coupled to the communications ports.

The communications ports are each coupled to a semiconductor squib arrangement disposed on silicon substrate 70. As described with respect to FIG. 3, the silicon substrate has formed therein a squib firing region 71 that, as described, ignites upon application of a predetermined minimum quantum of energy. The squib firing region is arranged near a preheating region 72. In some embodiments of the invention, a heat sink (not shown in this figure), facilitates maintaining the substrate temperature below a predetermined threshold.

In this specific illustrative embodiment of the invention, airbag control system 80 unlike second airbag controller 32 described above with respect to FIG. 2, does not contain an energy storage element. Electrical energy is accumulated in a storage element (not shown) that is disposed off of the airbag control system. Thus, the communications ports convey bidirectional data, as noted, and also a current for operating the preheater portion of the squib arrangement on silicon substrate 70. At such time as it is determined that a fault condition is present in the vehicle warranting deployment of the airbag (not shown), the communications ports additionally convey the necessary current that will cause squib firing region 71 to ignite, setting off a gas generator (not shown) that will inflate a supplemental restraint airbag of the vehicle.

Squib firing requires a minimum predeterminable quantum of energy which, in the context of the present invention, is effected by a combination of heat applied to the squib firing region, and the firing current delivered from the energy storage element in response to the vehicle fault signal. As previously noted, the squib firing region is heated, illustratively by the application of a current to the preheating region. The energy required to effect the squib firing is proportional to the difference in temperature required to achieve the flash point temperature of the squib region. That is, the higher the preheating temperature, the lower is the additional energy required to achieve the firing, and consequently, the lower is the magnitude of the required firing current. Of course, the squib firing preheat temperature must be maintained at a safe temperature below the firing threshold. It is to be understood that preheating of the squib can be achieved from other sources of heat that are not necessarily disposed on the silicon substrate.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A squib control arrangement for an airbag restraint system for a vehicle, the squib control arrangement comprising:

communication means for receiving electrical input signals containing a data component and an energy component;

a squib having a firing portion and a preheating portion, whereby heat produced in said preheating portion is conducted to said firing portion;

first coupling means for coupling said communication means to said preheating portion of said squib, and for supplying electrical energy thereto in response to said energy component of said electrical input signals; and second electrical coupling means for coupling said communication means to said firing portion of said squib, for causing said squib to fire in response to said data component of said electrical input signals.

2. The squib control arrangement of claim 1 wherein said firing portion of said squib is formed of a silicon material.

3. The squib control arrangement of claim 2 wherein said firing and preheating portions of said squib are integrally formed.

4. The squib control arrangement of claim 3 wherein said firing and preheating portions of said squib are integrally formed on a silicon material.

5. The squib control arrangement of claim 3 wherein there is further provided heat sink means for drawing heat away from said firing portion of said squib.

6. The squib control arrangement of claim 2 wherein there is further provided temperature control means for monitoring the temperature of said squib.

7. The squib control arrangement of claim 6 wherein said temperature control means and said firing and preheating portions of said squib are integrally formed on a silicon material.

8. The squib control arrangement of claim 1 wherein there is further provided energy storage means coupled to said communication means for storing electrical energy in response to said energy component of said electrical input signals.

9. The squib control arrangement of claim 8 wherein there is further provided a transformer means for controlling a quantum of energy stored in said energy storage means.

10. The squib control arrangement of claim 8 wherein there is further provided an airbag control unit having an airbag control unit output for producing said electrical input signals provided to said communication means, and there is further provided electrical coupling means for connecting said airbag control unit output to said communication means.

11. A control arrangement for controlling deployment of a deployable airbag of a vehicle, the vehicle having at least one fault sensor for providing a fault signal in response to the occurrence of a fault condition that would require the deployment of the deployable airbag, the control arrangement comprising:

an airbag controller formed on a silicon substrate, said airbag controller further having formed on said silicon substrate:

squib means coupled to a communication control means for firing in response to the fault signal and a preheat energy whereby the deployable airbag is deployed;

self-diagnostic means for performing a diagnostic process on said airbag controller; and communications port means for receiving a data signal which includes information responsive to the fault sensor, and for transmitting self-diagnosis data from said self-diagnostic means.

12. The control arrangement of claim 11, wherein there is further provided:

energy storage means for storing electrical energy; and preheater means for providing the preheat energy to said squib means.

13. The control arrangement of claim 12, wherein said squib means and said preheater means are integrally formed on said silicon substrate.

14. The control arrangement of claim 12, wherein there is further provided energy transformer means for converting said electrical energy to a higher potential, whereby a greater quantum of energy is stored in said energy storage means.

15. The control arrangement of claim 12, wherein there is further provided preheat monitoring means for providing an electrical characteristic responsive to the magnitude of the preheat energy.

16. The control arrangement of claim 15, wherein said preheat monitoring means is formed on said silicon substrate.

17. A method of firing a squib having a predeterminable ignition threshold temperature, for deploying an inflatable airbag of a vehicular supplemental restraint system, the method comprising the steps of:

forming the squib on a silicon substrate;

first supplying an electrical energy to a heater element formed on the silicon substrate whereby the heater element generates a preheat energy;

applying the preheat energy from the heater element to the squib whereby the squib is heated to a preheat temperature that is below its ignition threshold temperature; and second supplying a further electrical energy to the squib, whereby the combination of the preheat energy supplied to the squib and the further electrical energy exceed the ignition threshold temperature of the squib.

18. The method of claim 17, wherein there is further provided the step of forming the heater element on the silicon substrate.

19. The method of claim 17, wherein prior to performing said step of second supplying there is provided the further step of storing the further electrical energy in a storage element and in an amount that corresponds to the difference between the predeterminable ignition threshold temperature and the preheat temperature.

20. The method of claim 17, wherein there are provided the further steps of:

forming a heat monitor on the silicon substrate;

monitoring with the heat monitor the preheat energy applied from the heater element to the squib; and controlling the rate of generation of the preheat energy in response to said step of monitoring.

* * * * *